US005746936A

United States Patent [19]

Mercado

[11] Patent Number: 5,746,936

[45] Date of Patent: May 5, 1998

[54] HYPOCHLORITE BLEACHING COMPOSITION HAVING ENHANCED FABRIC WHITENING AND/OR SAFETY BENEFITS

[75] Inventor: Hedeliza Malonzo Mercado, Scarborough, Canada

[73] Assignee: Colgate-Palmolive Co., New York, N.Y.

[21] Appl. No.: 710,217

[22] Filed: Sep. 13, 1996

[51] Int. Cl.$^{6}$ .............................. C01B 11/06; D06L 3/06

[52] U.S. Cl. .............................. 252/187.25; 252/187.24; 252/187.26

[58] Field of Search ........................ 252/187.24, 187.25, 252/187.26

[56] References Cited

U.S. PATENT DOCUMENTS

| | | | |
|---|---|---|---|
| 4,614,606 | 9/1986 | Machin et al. | 510/397 |
| 4,681,696 | 7/1987 | Bruegge et al. | 252/186.35 |
| 4,714,562 | 12/1987 | Roselle et al. | 252/187.24 |
| 4,867,896 | 9/1989 | Elliott et al. | 252/187.26 |
| 5,089,162 | 2/1992 | Rapisarda et al. | 252/187.24 |
| 5,185,096 | 2/1993 | Ahmed | 252/187.24 |
| 5,236,614 | 8/1993 | Jacquet et al. | 252/186.36 |

FOREIGN PATENT DOCUMENTS

| | | |
|---|---|---|
| 8600635 | 1/1986 | European Pat. Off. . |
| 0653482 | 5/1995 | European Pat. Off. . |
| 0653483 | 5/1995 | European Pat. Off. . |
| 0668345 | 8/1995 | European Pat. Off. . |

*Primary Examiner*—Joseph D. Anthony
*Attorney, Agent, or Firm*—Bernard Lieberman; James M. Serafino

[57] ABSTRACT

An aqueous liquid bleaching composition having a pH of from 9 to 14 is disclosed which is particularly suitable as a pre-wash and laundering composition for fabrics. The composition comprises (a) an alkali metal hypochlorite; (b) an alkali metal carbonate; (c) an alkali metal hydroxide; and (d) an alkali metal phosphate. The method of bleaching fabrics with said bleaching composition is also described.

9 Claims, No Drawings

HYPOCHLORITE BLEACHING COMPOSITION HAVING ENHANCED FABRIC WHITENING AND/OR SAFETY BENEFITS

BACKGROUND OF THE INVENTION

The present invention relates to an aqueous liquid bleaching composition. More particularly, the invention relates to a liquid bleaching composition which is suitable for laundry and household applications and which is particularly suitable as a pre-wash bleaching composition in laundry applications.

Liquid bleaching compositions containing hypochlorite for removing stains from fabrics are well-known in the art. EP 653 483 discloses a liquid bleaching composition which consists of an alkali metal hypochlorite, sodium silicate and optionally sodium carbonate for washing fabrics. The presence of silicate in the aqueous composition is said to improve fabric whiteness and fabric safety of fabrics contacted with such composition by eliminating metal impurities in the composition and in the wash water. Such metal impurities include copper, iron, nickel and cobalt which are thought to adversely affect fabric whiteness and fabric strength by catalyzing the degradation of hypochlorite on fabrics.

EP 653 482 discloses a bleaching composition comprising hypochlorite, sodium hydroxide, sodium carbonate and a complexing agent selected from the group of polycarboxylic acid derivatives of pyridine. The bleaching composition is said to provide improved whiteness and safety to fabrics by binding metal ions such as Ni, Co, Cu, Mn, Pd and Fe, among others, which are said to be detrimental to the performance of a hypochlorite bleach.

In EP 668 345 an aqueous bleaching composition is disclosed which similarly seeks to provide improved whiteness and improved fabric safety for fabrics. The composition contains hypochlorite, sodium hydroxide, sodium carbonate and a defined aromatic compound such as benzoic acid to serve as a "radical scavenger". The function of this scavenger is to inactivate the free radicals formed by the decomposition of hypochlorite, which free radicals are said to be detrimental to fabrics.

WO 86/00635 discloses a solution of trisodium phosphate, sodium hydroxide and sodium hypochlorite as a composition effective for removing protein stains from fabrics.

Although numerous hypochlorite-based bleaching compositions are described in the prior art for laundry applications, the particular benefits associated with the use of phosphate ion to achieve enhanced fabric whiteness and/or fabric safety in laundry applications has heretofore gone unrecognized.

SUMMARY OF THE INVENTION

The present invention provides an aqueous liquid bleaching composition having a pH of from 9 to 14 which is particularly suitable as a pre-wash and laundering composition for fabrics comprising:

(a) an alkali metal hypochlorite;

(b) a source of alkalinity to provide the desired pH within the aforesaid range of from 9 to 14;

(c) at least 0.2%, by weight, of an alkali metal salt of carbonate; and (d) an alkali metal salt of phosphate whereby said phosphate enhances the performance of said bleaching composition to provide improved whitening and/or fabric safety when bleaching fabrics in comparison to the performance provided by an otherwise identical bleaching composition which is free of said phosphate.

In a preferred embodiment of the invention the bleaching composition further contains periodate ion in an amount of from 0.0009% to 0.5% and preferably from 0.001 to 0.1%, by weight, of the composition. The periodates may be added in the form of an alkali metal periodate, such as sodium or potassium periodate, or alternatively, may be formed insitu by the reactions of appropriate iodine compounds such as the reaction of an alkali metal iodide and iodine to form the periodate.

In accordance with the method of the invention, there is provided a method of bleaching or washing fabrics characterized by improved fabric whitening and/or fabric safety comprising the step of contacting said fabrics with an aqueous liquid bleaching composition having a pH of from 9 to 14 comprising:

(a) an alkali metal hypochlorite;

(b) a source of alkalinity to provide the desired pH within the aforesaid range of from 9 to 14;

(c) an alkali metal salt of carbonate; and (d) an alkali metal salt of phosphate whereby said phosphate enhances the performance of said bleaching composition to provide improved whitening and/or fabric safety when bleaching fabrics in comparison to the performance provided by an otherwise identical bleaching composition which is free of said phosphate.

In a preferred mode of carrying out the method of the invention, the fabrics are first washed or bleached with the bleaching composition of the invention prior to washing them with a detergent composition containing one or more surfactants. This sequence of bleaching and washing provides enhanced stain removal and fabric whiteness as compared to a method wherein the fabrics are first washed with a detergent composition and then bleached with the compositions of the invention. In accordance with the aforementioned preferred method of the invention, the fabrics to be bleached are first contacted with the bleaching composition to effect the desired degree of bleaching for a period of time typically from 3 to 60 minutes, preferably 5 to 30 minutes. This is followed by rinsing the fabrics in water to at least partially remove the bleaching composition. Following the rinsing step, the fabrics are washed with a detergent composition.

The composition and method of the present invention is predicated on the discovery that for an aqueous bleaching composition comprising an alkali metal salt of hypochlorite and an alkali metal salt of carbonate wherein the pH of the bleaching composition is maintained within the range of 9 to 14, the inclusion of an alkali metal salt of phosphate provides an unexpected benefit to treated fabrics with regard to fabric whiteness and/or fabric safety.

DETAILED DESCRIPTION OF THE INVENTION

The liquid bleaching compositions of the invention are comprised of four essential components.

The first essential component is an alkali metal hypochlorite, preferably sodium hypochlorite. The bleaching amount of hypochlorite is typically from 2% to 10% by weight of the total composition based on active chlorine. Preferred compositions comprise from 3% to 7%, by weight, of alkali metal hypochlorite based on active chlorine.

The second essential component of the bleaching compositions is a source of alkalinity. The alkali metal hydroxides such as potassium and/or sodium hydroxide or alkali metal oxides such as sodium and/or potassium oxide are particularly suitable. The amount of oxide or hydroxide is generally less than 2%, by weight, of the total composition, preferably from 0.05% to 1.5%, and more preferably from 0.2% to 1.3%, by weight, of the composition. The pH of the bleaching compositions is from 9 to 14, preferably from 10.0 to 13.5 and most preferably from 12 to 13.5 for purposes of maintaining optimum stability and performance of the hypochlorite bleach.

The third essential component of the bleaching composition is an alkali metal salt of carbonate, preferably sodium carbonate. The amount of alkali metal salt of carbonate is generally from about 0.2% to 5%, by weight, preferably from about 0.2% to 4%, and most preferably from about 0.2% to 3%, by weight, of the bleaching composition. The carbonate salts effectively buffer the hypochlorite bleaching compositions and allow dilution of the composition in a wash solution for the purpose of bleaching fabrics while maintaining the pH in the desired range such that the generation of hypochlorous acid from hypochlorite is controlled.

The fourth essential component of the bleaching composition is an alkali metal salt of phosphate. It has been found that the presence of such phosphate salt in an aqueous liquid bleaching composition as herein described acts to improve fabric whiteness and/or inhibit the wearing out of fabrics contacted with such bleaching composition. Moreover, the phosphate salts significantly reduce or eliminate metal impurities in the bleaching composition as well as in the wash solution. These heavy metal impurities include heavy metal ions such as copper, iron, nickel, cobalt and the like which are believed to cause yellowing and weakening of fabric. In this regard, the activity of the phosphate salt is enhanced by the presence of the carbonate salt in the bleaching composition insofar as carbonate reacts with the hardness ions of calcium and magnesium present in the wash solution and causes their precipitation. The hardness ions are, therefore, removed from solution and are not available to react with the phosphate salt and reduce its activity in the wash solution.

Alkali metal salts of phosphate useful herein include sodium and potassium tripolyphosphate, tetrasodium and tetrapotassium pyrophosphate, and trisodium and tripotassium phosphate. The amount of alkali metal phosphate salt is generally from about 0.2 to 2.0%, by weight, of the composition, and preferably from about 0.2 to 0.7%, by weight.

An optional, but highly preferred, ingredient to stabilize the bleaching composition is a periodate or mixture of periodates. Suitable periodates for use herein include alkali metal periodates such as sodium and potassium periodates. Sodium periodate is preferred for use herein. The periodates may be added as such or may be generated insitu by reaction of appropriate iodine compounds. A preferred method of periodate generation is by the reaction of iodine and potassium iodide in the bleaching solution. The amount of periodate in the bleaching composition is generally from about 0.0009% to 0.5%, by weight, and preferably from about 0.0009% to 0.1%, by weight of the composition.

The balance of the compositions of the invention is water, generally from about 75% to 98%, by weight, and preferably from about 78% to 94%, by weight of the liquid bleaching composition.

The bleaching compositions are used in diluted form for bleaching of fabrics. For hand laundry applications, the dilution level by the individual user is typically from 0.4% to 20%, and for use in a washing machine the dilution level in the wash solution is typically from 0.1% to 10%, by weight, based on the total wash solution

EXAMPLE 1

Two bleaching compositions were prepared as shown in Table 1 below. Comparative Composition K is a reference composition which is commercially available. Composition A is in accordance with the present invention.

TABLE 1

Bleach composition of the invention (A) versus comparative bleach Composition (K).

| COMPONENT | COMPARATIVE COMPOSITION K Weight Percent | COMPOSITION A Weight Percent |
|---|---|---|
| Sodium Hypochlorite | 5.0% | 5.0% |
| Sodium Hydroxide | 0.7 | 0.7 |
| Sodium Carbonate | 1.5 | 1.5 |
| Sodium Tripolyphosphate | 0.0 | 0.7 |
| Water and Minor Adjuvants | Balance | Balance |
| pH | 13.0 | 13.0 |

Two sets of cloth consisting of 100% cotton material were used for the tests described below.

Test Condition—A 6-cycle soaking/rinsing test was conducted using each of the above-described bleaching compositions by itself. The test was performed in a stainless steel beaker. First, 40 C. tap water prepared to contain 2 ppm Fe/1.5 ppm Cu was added to the beaker followed by the bleach composition and then the cloths finally added to the solution. The proportion of cloth to bleach solution was based on 100 grams of cloth per liter of bleach solution; the concentration of the bleach composition in solution was 137.5 grams per liter of solution. The cloths were soaked for 30 minutes and to insure constant temperature the solution containing the cloths was placed in an oven maintained at 40° C. After 30 minutes, the solution was removed and fresh 40° C. tap water prepared to contain 2 ppm Fe and 1.5 ppm Cu was added to rinse the cloths. Rinsing was done for 2 minutes with agitation. The soaking/rinsing cycle was repeated up to six cycles. At the end of the 6th cycle, the cloths were air dried.

Each of the two sets of cloth were submitted to a panel of 20 members to compare the whiteness provided by the test bleach compositions. The results are shown in Table 2 below.

TABLE 2

| | SET 1 | SET 2 |
|---|---|---|
| | No. of Panelists | |
| Whiter for Comparative Composition K | 0 | 0 |
| Whiter for Composition A | 20 | 20 |
| Comparable Whiteness | 0 | 0 |

The clear preference of the panelists for the whiteness provided by Composition A demonstrates the unexpected whiteness improvement provided by the bleach composition of the present invention relative to a bleach composition which is otherwise identical in composition except for the presence of phosphate.

I claim:

1. An aqueous liquid bleaching composition having a pH of from 9 to 14, which is particularly suitable as a pre-wash and laundering composition for fabrics, said liquid composition consisting essentially of:

(a) from about 2.0% to about 10%, by weight, of an alkali metal hypochlorite;

(b) a source of alkalinity to provide the desired pH within the aforesaid range of from 9 to 14;

(c) from about 0.2 to about 5%, by weight, of an alkali metal carbonate;

(d) from about 0.2 to about 2.0%, by weight, of an alkali metal salt of phosphate whereby the said phosphate enhances the performance of the said bleaching composition to provide improved whiting and/or fabric safety when bleaching fabrics in comparison to the performance provided by an otherwise identical bleaching composition which is free of said phosphate;

(e) optional periodate ion stabilizer(s) and (f) the balance being essentially water.

2. A composition according to claim 1 which contains from about 0.2% to about 0.7% by weight of said alkali metal salt of phosphate.

3. A composition according to claim 1 wherein said phosphate is sodium or potassium tripolyphosphate.

4. A composition according to claim 1 wherein said phosphate is tetrasodium or tetrapotassium pyrophosphate.

5. A composition according to claim 1 which contains from 3% to 7% by weight of said alkali metal hypochlorite.

6. A composition according to claim 1 which contains from about 0.2% to about 3% by weight of said alkali metal carbonate.

7. A composition according to claim 1 which further contains periodate ion.

8. A composition according to claim 1 wherein said source of alkalinity is an alkali metal hydroxide.

9. A composition according to claim 8 wherein said alkali metal hydroxide is sodium hydroxide.

* * * * *